Figure 1:
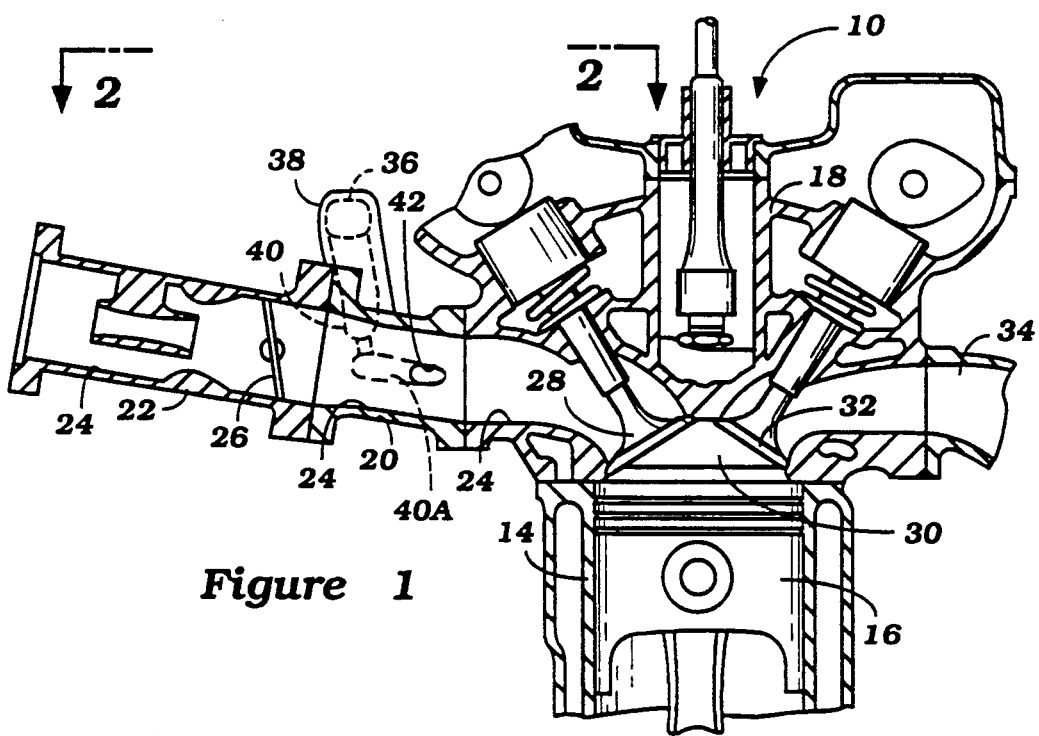

United States Patent [19]

Tezuka et al.

[11] Patent Number: 5,056,474
[45] Date of Patent: Oct. 15, 1991

[54] INTERNAL COMBUSTION ENGINE HAVING MULTIPLE CARBURETORS AND A STARTING MIXTURE

[75] Inventors: Etsuhiro Tezuka, Hamamatsu; Koichiro Kaji, Iwata; Toru Ichinose, Fukuroi, all of Japan

[73] Assignee: Yamaha Hatsudoki Kabushiki Kaisha, Iwata, Japan

[21] Appl. No.: 577,088

[22] Filed: Aug. 31, 1990

Related U.S. Application Data

[60] Division of Ser. No. 378,833, Jul. 12, 1989, abandoned, which is a division of Ser. No. 792,223, Oct. 25, 1985, Pat. No. 4,867,109, which is a continuation of Ser. No. 410,390, Aug. 23, 1982, abandoned, which is a continuation of Ser. No. 115,414, Jan. 25, 1980, abandoned, which is a continuation of Ser. No. 854,260, Nov. 23, 1977, abandoned.

[51] Int. Cl.[5] ............................................. F02M 35/10
[52] U.S. Cl. ...................... 123/52 MB; 123/179 G; 123/580
[58] Field of Search .......... 123/52 M, 52 MB, 179 G, 123/180 AC, 575, 576, 579, 580, 180 E, 187.5

[56] References Cited

U.S. PATENT DOCUMENTS

| | | | |
|---|---|---|---|
| 1,659,621 | 2/1928 | Woolson | 123/180 AC |
| 3,030,819 | 4/1962 | Edelbrock | 123/579 |
| 3,614,945 | 10/1971 | Schlagmuller et al. | 123/187.5 R |
| 3,742,922 | 7/1973 | Hisatomi et al. | 123/52 M |
| 3,814,069 | 6/1974 | Croft et al. | 123/52 M |
| 4,016,838 | 4/1977 | Yoshioka et al. | 123/579 |
| 4,230,086 | 10/1980 | Lovret | 123/187.5 R |
| 4,498,434 | 2/1985 | Baltz et al. | 123/187.5 R |
| 4,542,723 | 9/1985 | Fujimoto | 123/187.5 R |
| 4,815,427 | 3/1989 | Radtke | 123/180 E |

Primary Examiner—David A. Okonsky
Attorney, Agent, or Firm—Ernest A. Beutler

[57] ABSTRACT

The invention is directed towards a fuel enrichment system for a multi cylinder internal combustion engine. Each cylinder of the engine is served by a separate carburetor. Manifold passageways are interposed between the cylinders and the respective carburetors for supplying the fuel/air mixture to the cylinders. The system further includes a balance passage which provides communication between each of the passageways. A starting fuel/air mixture is delivered to the cylinders through the balance passage.

2 Claims, 1 Drawing Sheet

U.S. Patent  Oct. 15, 1991  5,056,474

INTERNAL COMBUSTION ENGINE HAVING MULTIPLE CARBURETORS AND A STARTING MIXTURE

This is a division of U.S. patent application Ser. No. 378,833, filed July 12, 1989, now abandoned, which is a divisional of Ser. No. 792,223, filed Oct. 25, 1985 and now U.S. Pat. No. 4,867,109, which is a continuation of Ser. No. 410,390, filed Aug. 23, 1982 now abandoned, which is a continuation of Ser. No. 115,414, filed Jan. 25, 1980, abandoned, which is a continuation of Ser. No. 854,260, filed Nov. 23, 1977 abandoned.

This invention relates to an intake passage arrangement for use in an multi-cylinder internal combustion engine equipped with an intake balance conduit communicating the respective passages.

In multi-cylinder internal combustion engines of the type having a plurality of separate intake throttle valves, it is known to provide an intake balance conduit to communicate the respective intake passages so as to balance variations in intake gas amount resulting from variations in throttle valve opening degree in the respective cylinders. Such a conventional intake balance conduit has been opened to the intake passages at a right angle to the longitudinal axis of the intake passages and in the vicinity of the throttle valves in the respective intake passages. This arrangement was satisfactory to balance the intake gas amount in the respective intake passages, but it has been found that it was not effective to provide maximum engine combustion performance. Additionally, where the intake balance conduit is utilized to effect exhaust gas recirculation (EGR) from the exhaust passages to the intake passages, impurities will build up and soil the throttle valves and the vicinity thereof to cause changes in the opening area of the intake passages when the engine is idling, which results in defective engine operation.

Therefore, the present invention has for its object to provide an improved intake passage arrangement for internal combustion engines which can eliminate the above disadvantages and which can positively improve combustion conditions in the cylinders.

In accordance with the present invention, there is provided an intake passage arrangement for a multi-cylinder internal combustion engine having a plurality of throttle valves in its respective intake passages, the arrangement comprising an intake balance conduit having its branch portions opened to each intake passage between the throttle valve and the intake valve so as to connect the respective intake passages with each other at an acute angle relative to the direction of stream of the intake gas mixture.

Preferably, carburetors having a throttle valve therein are connected through intake manifolds to the internal combustion cylinders, respectively, and the intake balance conduit is opened to the intake passages of the respective intake manifold so as to make large the distance between the throttle valve and the opening to the intake passage.

Also, intake balance conduit is preferably but optionally connected to an exhaust gas recirculation passage to effect exhaust gas recirculation from the exhaust passages through the intake balance conduit to the intake passages. This arrangement can reduce the number of required parts and results in a simple intake passage arrangement which can keep the throttle valves free from impurities while effecting exhaust gas recirculation performance.

Figure 2:
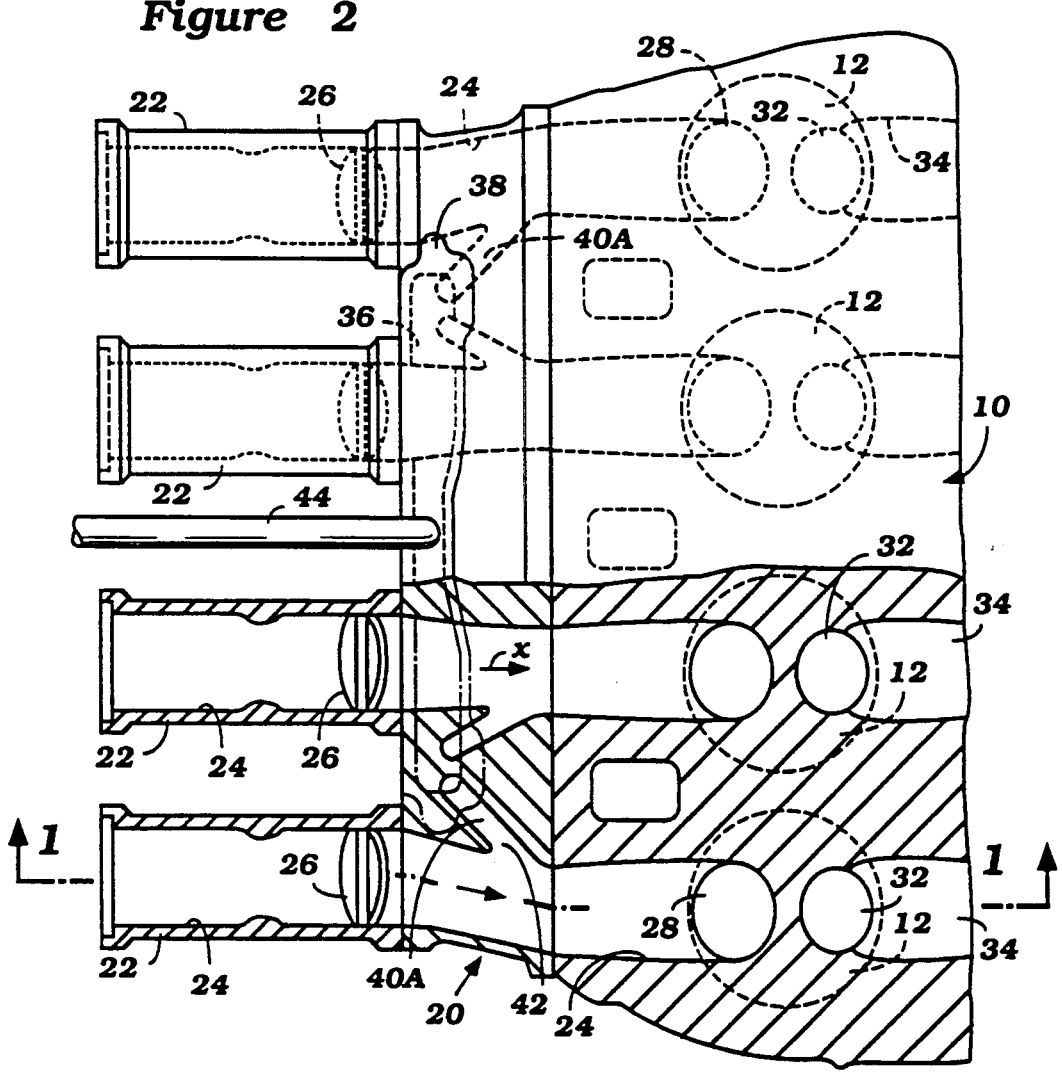

One embodiment of an intake passage arrangement according to the present invention will now be described, by way of example, with reference to the accompanying drawings in which:

FIG. 1 is a fragmentary axial section of the presently preferred embodiment of the invention; and FIG. 2 is a top view of FIG. 1, partly in cutaway cross-section.

A multi-cylinder internal combustion engine 10 has a plurality of cylinders, each comprising a cylinder 14, a piston 16 and a cylinder head 18 and connected through an intake manifold 20 to a carburetor 22. They are identical to one another. Therefore only one is shown in detail. The "intake manifold" 20 is actually an adaptive insert for the application of this invention. It can be interposed between the cylinder head and the carburetors, and serves as a spacer to provide a substantial spacing between the throttle valve and the intake valve 28 of the cylinder. Each reference numeral 24 designates one of a plurality of intake passages (in this case there are four intake passages), each having therein a respective throttle valve 26 for opening and closing whereby to control the amount of the intake gas mixture. This mixture is sometimes called a "charge". When a carburetor is used, the charge is a fuel/air mixture. If other charge forming means are used, then at least one element of the charge will flow through the intake passage.

In the illustrated embodiment, the carburetor for each cylinder has therein the throttle valve and part of the total intake passage downstream from the throttle valve. The air/fuel mixture in the intake passage is supplied through an intake valve 28 to a combustion chamber 30, and the exhaust gas after explosion is discharged through an exhaust valve 32 to an exhaust passage 34.

In the upper side of the intake manifold 20 there is provided an intake balance conduit 36 having branch portions 40 opened to the intake passages of the respective intake manifolds 20 at 42. The end portions 40A of the branch portions 40 are connected to the intake manifolds 20 at an acute angle (about 30°) relative to the direction of stream flow (indicated by the arrow X in FIG. 2) and the openings 42 are positioned between the throttle valve 26 and the intake valve 28. Preferably, the opening 42 is positioned relatively remote from the throttle valve 26 in order to prevent impurities from adhering to the throttle valve 26 and the vicinity thereof, even where an exhaust gas recirculation passage 44 is connected to the intake balance conduit 36 to effect exhaust gas recirculation from the exhaust passage 34 to the intake passage 24.

Furthermore, it is possible in accordance with the present invention to utilize the intake balance conduit as a starter conduit by introduction of warming up mixture into the intake balance conduit 36 to supply it into the engine from the opening 42.

The above described intake passage arrangement made in accordance with the present invention provides the following advantages: First, such an arrangement wherein the intake balanced conduit is connected to the intake passages at an acute angle with the direction of stream of the air/fuel mixture provides a balance intake gas introduction to positively form a stratified stream of intake gas, resulting in improved combustion conditions in the cylinders. As a result, the required advance of the ignition timing is retarded to reduce variations in combustion conditions when the engine is under low load conditions. This makes it easy to maintain the engine operation smooth. In this case, the opening 42 of the intake balance conduit is preferably positioned at a substantial distance from the throttle valve 26, and near the intake valve 28. Second, where the internal combustion engine is equipped with exhaust gas recirculation means, such an arrangement that the exhaust gas recirculation passage is connected to the intake balance conduit to recirculate the exhaust gas from the openings 42 to the intake passages 24 provides a simple intake passage arrangement capable of preventing impurities from adhering to the throttle valve 26 and the vicinity thereof. This provides a constant throttle valve opening area when the engine is idling so as to maintain the air/fuel ratio constant while the engine is idling.

This invention is not to be limited by the embodiment shown in the drawings and described in the description, which is given by way of example and not of limitation, but only in accordance with the scope of the appended claims.

We claim:

1. A fuel enrichment system for a multi cylinder internal combustion engine having a plurality of cylinders, a separate carburetor for each of said cylinders, a manifold interposed between said cylinders and said carburetors for supplying a fuel/air mixture from said carburetors to said cylinders, said manifold having individual passageways each extending from one of said carburetors to one of said cylinders, balance passage means interposed between said carburetors and said cylinders for communicating said passageways of said manifold with each other, and means for delivering a starting fuel/air mixture to said cylinders through said balance passage means.

2. A fuel enrichment system as set forth in claim 1 wherein the starting fuel/air mixture is delivered to the balance passage means substantially at its midpoint.

* * * * *